Nov. 23, 1965
V. L. ROGALLO
3,218,850
THERMO-PROTECTIVE DEVICE FOR BALANCES
Filed Aug. 14, 1962
2 Sheets-Sheet 1
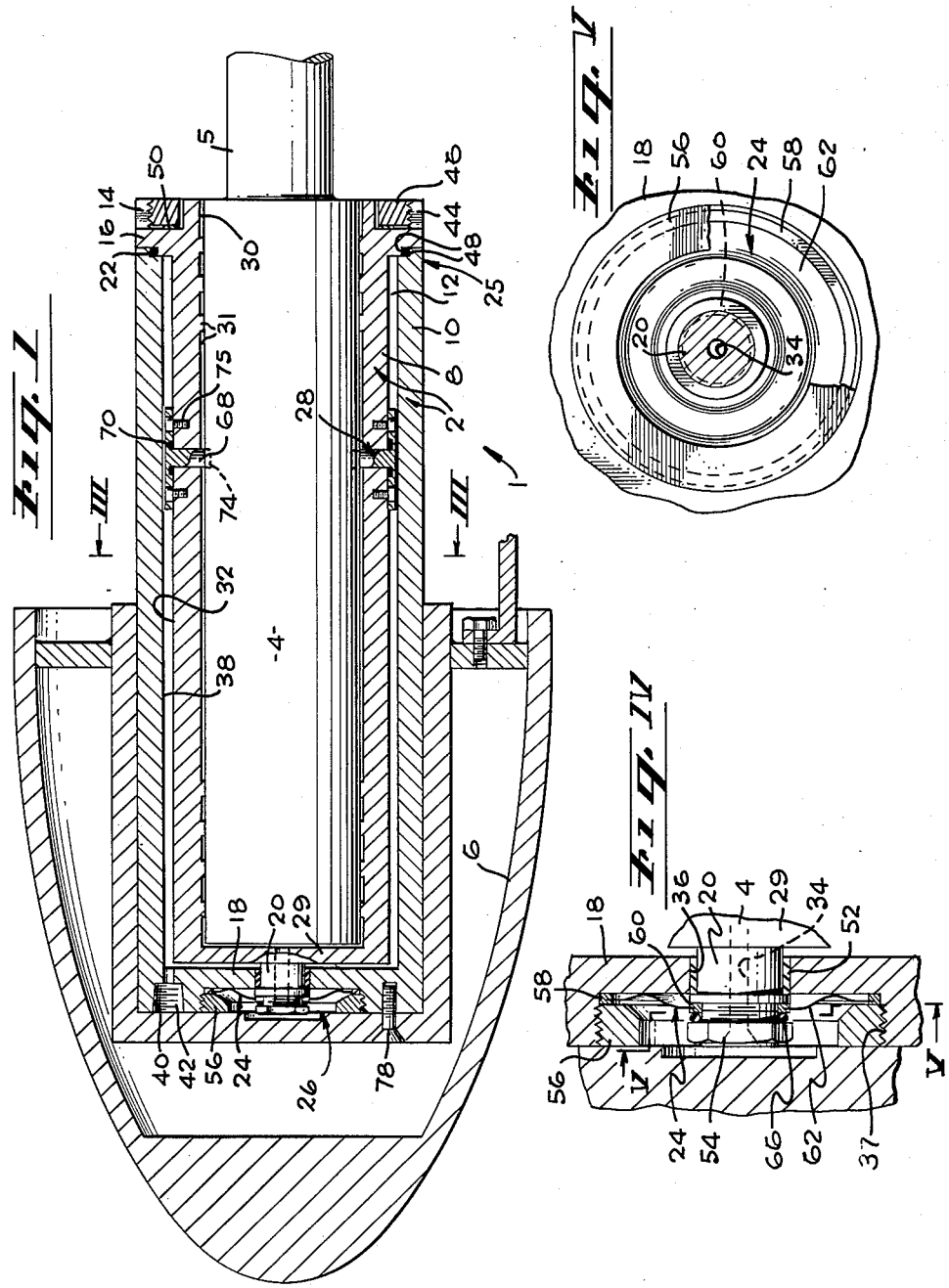
INVENTOR.
VERNON L. ROGALLO
BY
Howard B. Scheckman
ATTORNEYS

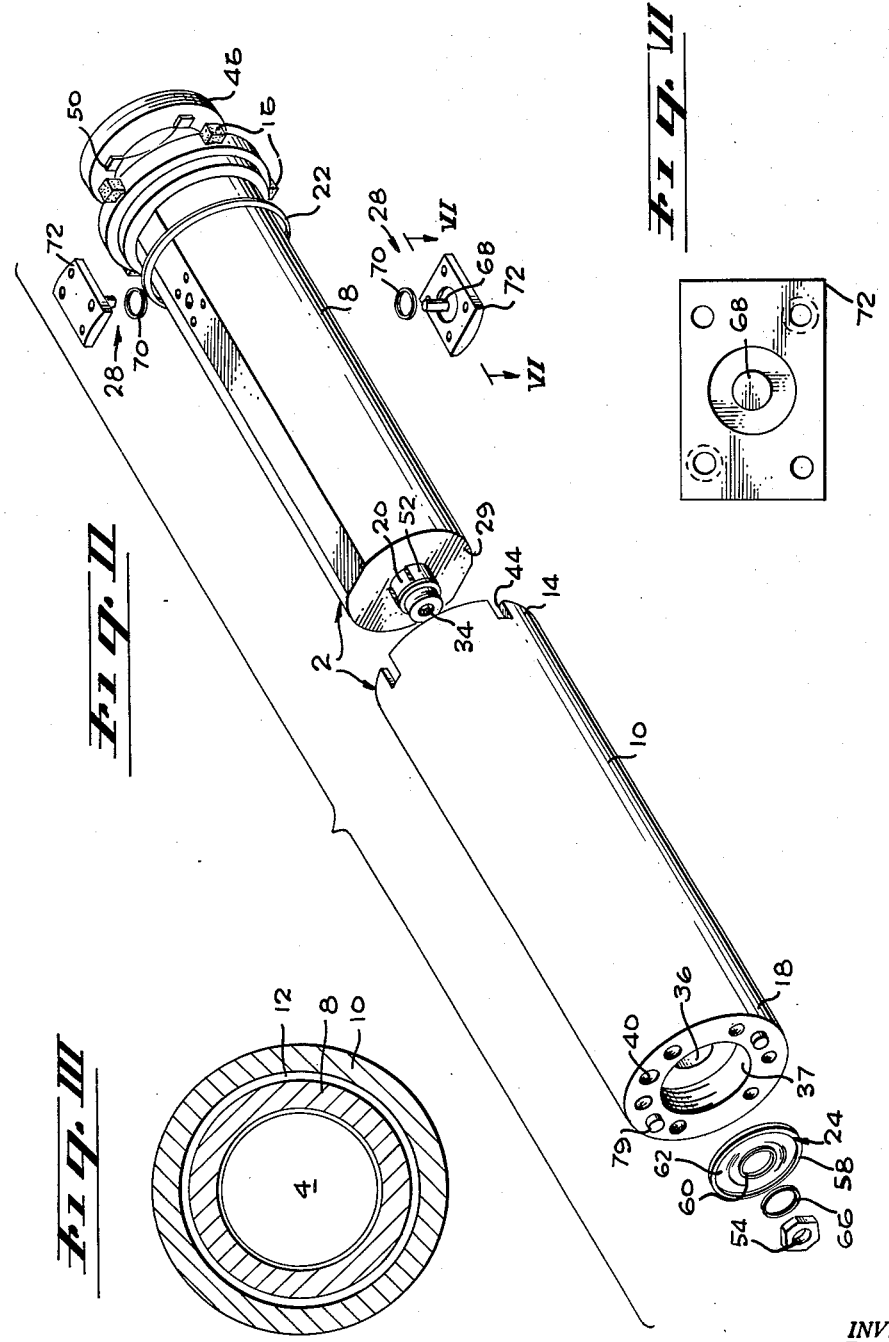

United States Patent Office 3,218,850
Patented Nov. 23, 1965

3,218,850
THERMO-PROTECTIVE DEVICE FOR BALANCES
Vernon L. Rogallo, Los Altos, Calif., assignor to the United States of America as represented by the Administrator of the National Aeronautics and Space Administration
Filed Aug. 14, 1962, Ser. No. 216,939
11 Claims. (Cl. 73—147)
(Granted under Title 35, U.S. Code (1952), sec. 266)

The invention described herein may be manufactured and used by or for the Government of the United States of America for governmental purposes without the payment of any royalties theron or therefor.

This invention relates to a force balance and more particularly to a thermo-protective shield for such a balance.

Force balances are well known. In load testing aircraft models in wind tunnels, it is generally the practice to mount the models upon force balances. The balances are employed to make all or part of the following aerodynamic measurements: axial force, normal force, side force, pitch moment, roll moment and yaw moment. When these load tests are made, the stagnation temperatures on the test models are after very high. If these high model temperatures are transferred to the balance, either evenly or differentially, erroneous output readings may result.

Different systems have been tried to obviate the effects of high or uneven balance temperatures. Some balance systems employ fluid coolants. These systems have many disadvantages. The weight of the cooling apparatus often introduces undesirable unsymmertical forces. The force of the fluid is difficult to neutralize or cope with and may necessitate a balance which is only sensitive to a single force or component.

It is very time consuming to change test models when coolant ducting must be disconnected and connected.

Other balance systems have neither a fluid coolant nor temperature insulation and attempt to compensate for the temperature changes within the balance. It is diffcult to achieve adequate compensation even when complicated balance construction is employed. U.S. Patent No. 2,844,027 pertains to a balance which is unprotected from model temperature changes and is provided with internal temperature compensating apparatus.

It is an object of this invention to provide a balance unit that does not require external connections or devices that compensate for heat.

It is another object of this invention to provide a balance unit that is not affected by expansion or contraction of its various parts.

It is another object of this invention to provide a heat shield for a balance unit that forms an efficient heat barrier.

Other objects and advantages will appear from the specification and claims taken in connection with the drawings wherein:

FIG. 1 is a sectional view of a balance unit showing the heat shield;

FIG. 2 is an exploded view of the heat shield;

FIG. 3 is a sectional view along line III—III of FIG. 1 showing the containers of the heat shield;

FIG. 4 is an enlarged detail view of a portion of FIG. 1 showing the sliding joint between the containers, and the opening for the instrumentation leads;

FIG. 5 is a sectional view along lines V—V of FIG. 4 showing the front of the diaphragm to seal the container; and FIG. 6 is an enlarged view of the balance connecting means along line VI—VI of FIG. 2.

*Invention in general*

The basic concept of this invention is to provide a balance unit (indicated by arrow 1) with heat shield 2 to protect force balance 4 during tests on model 6.

Essentially the heat shield is made up of inner and outer container members 8, 10. They are spaced apart and form a vacuum chamber 12 between them.

Inner container 8 is made of material having properties of a heat sink.

The combination of a vacuum and heat sink has been found to be a very good heat barrier. It is possible to run high temperature tests on model 6 without balance 4 being adversely effected by heat.

The heat shield is also made so expansion or contraction of its parts will not be transmitted to the balance. Outer container 10 is connected to inner container 8 at only two places. Its end 14 (FIG. 1 right side) is connected to ears 16 of inner container 8. Its front 18 (FIG. 4) is movably connected to neck 20 on inner container 8.

When container 10 expands longitudinally, since it is only fastened at rear end 14, its front 18 is free to slide longitudinally along neck 20.

When container 10 expands radially, it can move radially along ears 16.

No structure interferes with either radial or longitudinal movement of container 10 and therefore no expansion forces are transmitted to balance 4.

Referring to FIG. 2, expansion seal means 22 and 24 are provided to maintain the vacuum between containers 8, 10 during relative movement.

*Invention specifically*

Referring to FIG. 1 there is disclosed a sectional view through a balance unit 1 comprising heat shield 2 and balance 4.

The balance is conventional. It is usually provided with instruments, such as strain gauges to measure any or all the six component forces on the model. It has a conventional projecting portion 5 fixed to a support (not shown). The balance is shown only in outline.

Heat shield 2 comprises essentially five major parts:
(1) Inner container 8;
(2) Outer container 10, that carries test model 6;
(3) Means 25 interconnecting containers 8 and 10 for relative radial movement;
(4) Means 26 interconnecting containers 8 and 10 for relative longitudinal movement; and
(5) Means 28 to connect inner container 8 to balance 4.

*Inner container*

Inner container 8 surrounds balance 4. It is cup-shaped, tubular, has an axial neck 20 on front end 29, and its other end 30 is open.

Its inner surface 31 is provided with a series of ridges that engage the outer surface of balance 4. Ridges are used to provide as small an area of contact as possible. This minimizes heat transfer from container 8 to balance 4.

Inner container 8 is a heat sink. It is made of material whose properties provide a high temperature gradient to passage of heat through its surface. There are many materials that have this property. For example, 17–4PH steel have satisfactory properties as a heat sink as well as the necessary strength.

Outer surface 32 may be gold-plated to retard heat transfer through emission.

An opening 34 (FIG. 4) may be provided in neck 20 to permit passage of leads to the balance for instrumentation purposes. If desired, the leads could be taken from a different location.

Outer container

Outer container 10 surrounds inner container 8. It is cup-shaped, tubular, and coaxial and concentric to inner contaienr 8. Rear end 14 (FIG. 1) is open.

An opening having surface 36 is provided in its front end for passage of neck 20.

Chamber 12 (FIGS. 1 and 3) is formed between facing surfaces 32 and 38 of the containers.

Means in the form of opening 40 containing closure 42, is provided in front end 18 to permit evacuation of chamber 12 to form a vacuum chamber.

Surface 38 may also be gold-plated to decrease emission.

Means interconnecting and sealing containers for relative radial movement

Referring to FIG. 2, means in the form of four radially projecting ears 16 on container 8, corresponding notches 44 in container 10, "O"-ring 22, and nut 46, connects and seals containers 8 and 10 for relative radial movement.

Ears 16 extend all the way through container 10.

A step 48 (FIG. 1) is provided between containers 8 and 10. Carried between the steps is seal means in the form of "O"-ring 22.

Nut 46 is externally threaded. It is screwed into threaded end 14 of container 10. Nut 46 clamps ears 16 in notches 44 to hold the containers together. It also places "O"-ring 22 under compression. The "O"-ring will contract and expand to follow the movement of container 10 to maintain a seal between the containers.

Nut 46 has pads on its inside surface. Pads are used to provide a small area of contact between nut 46 and container 8 to reduce the area of heat transfer.

Means interconnecting and sealing containers for relative longitudinal movement Means are provided to connect the containers for longitudinal movements while still maintaining a vacuum between the containers. Referring to FIGS. 4 and 5, the means includes neck 20, slip-joint bearing 52, passage surface 36, diaphragm member 24 and nuts 54 and 56.

Neck 20 is provided with bearing 52. Container 10 is provided with an opening whose inner surface 36 slidably receives bearing 52. When container 10 expands or contracts longitudinally, surface 36 will slide along bearing 52.

Means in the form of diaphragm member 24 seals this space between neck 20, bearing 52 and surface 36 during relative movement.

Diaphragm member 24 is made up of inner and outer Teflon rings 58, 60 and copper diaphragm 62 connected between rings 58 and 60.

Referring to FIG. 2, container 10 has a threaded opening 37 in its front. Diaphragm member 24 is inserted in this opening.

Large diameter nut 56 is screwed into outer container 10 against outer Teflon ring 58. Smaller diameter nut 54 is screwed on neck 20, forcing "O"-ring 66 (FIG. 2) against inner Teflon ring 60.

Outer and inner rings 58, 60 can move relative to each other, while diaphragm 62 will flex to compensate for the movement of containers 8, 10.

Means connecting inner container to balance

Means in the form of pin 68, "O"-ring 70, cap 72 and opening 74 in balance 4, connects inner container 8 to the balance.

Referring to FIG. 1, pin 68 passes through inner container 8 and fits in opening 74. "O"-ring 70 surrounds the pin. Cap 72 may be fastened to container 8 by screws 75. "O"-ring 70 is compressed by cap 72 against the pin to seal the opening between the pin and container 8.

Operation

In use, balance 4 is inserted into the interior of the inner container 8. The container and balance are keyed together by means 28.

The space between the two containers is evacuated to form vacuum chamber 12.

Model 6 is connected to outer container 10 by means such as screws 78 and projections 79 (FIG. 2).

During testing, the vacuum will retard passage of a major proportion of the heat. The heat sink will retard passage of heat that passes through the vacuum, or through points of contact between the containers.

With this combination, it is possible to protect the balance from heat until the test is finished. It has been found that while neither a vacuum nor a heat sink per se have provided suitable protection, the combination does provide effective protection.

When outer container 10 expands or contracts longitudinally, its front end 18 is free to move along bearing 52 or neck 20. Only its rear end 14 is longitudinally fixed to container 8.

When outer container 10 expands or contracts radially, it can move along ears 16.

With this construction, differential expansion of the two containers, either longitudinally or radially, resulting from differences in temperature, does not transmit any forces to the balance. The heat shield is constructed to expand and contract relatively to and independently of said balance.

Pads 50, bearing 52, inner surface ridges 31 and all contacting parts between the containers may be made of zirconium oxide ($ZrO_2$). Zirconium oxide ($ZrO_2$) is an insulator that has good wearing properties as well as a very low coefficient of friction.

Summary

This invention provides a balance unit having a self-contained heat shield that is integral with the balance, affords rapid change of test models, is simple in design, requires no maintenance of compensation, and eliminates the need for externally-connected apparatus such as fluid coolant systems. The invention is as well suited to single-component balances as multi-component balances such as six-component ones.

It makes use of a vacuum to improve insulation in combination with a heat sink to delay passage of heat that passes through the vacuum or contacting parts before the heat reaches the balance.

It permits relative movement with a slip-joint for longitudinal expansion and ears for radial expansion, while maintaining the vacuum between the two containers.

The invention in its broader aspects is not limited to the specific parts and combinations shown and described. Modifications may be made without departing from the principles of the invention as defined in the following claims.

What is claimed is:

1. In a balance unit, the combination comprising: a balance; a heat shield surrounding a major portion of said balance to substantially isolate it from adjacent heat sources, said shield having an inner wall adjacent said balance and an outer wall in spaced relation from and surrounding said inner wall, yieldable means for sealing the edges of said inner and outer walls, said zone between said inner and outer walls being evacuated, aerodynamic force transmitting means extending between said inner and outer walls; force transmitting means connecting said shield to said balance; and further force transmitting means for connecting said shield to an object exposed to aerodynamic forces.

2. In a balance unit, the combination comprising: a balance; a heat shield surrounding a major portion of said balance to substantially isolate it from adjacent heat sources, said shield having an inner wall adjacent said balance and an outer wall in spaced relation from and surrounding said inner wall, yieldable means for sealing the edges of said inner and outer walls, said zone between said inner and outer walls being evacuated, aerodynamic force transmitting means extending between said inner and outer walls; said aerodynamic force transmitting means enabling relative temperature expansion and contraction, radially and longitudinally, of said walls; force transmitting means connecting said shield to said balance; and further force transmitting means for connecting said shield to an object exposed to aerodynamic forces.

3. In a balance unit, the combination comprising: a balance sensitive to a plurality of aerodynamic forces; a heat shield surrounding a major portion of said balance to substantially isolate it from adjacent heat sources, said shield having an inner wall adjacent said balance and an outer wall in spaced relation and surrounding said inner wall, yieldable means for sealing the edges of said inner and outer walls, said zone between said walls being evacuated, said inner wall being a heat sink, aerodynamic force transmitting means extending between said inner and outer walls; said aerodynamic force transmitting means enabling relative temperature expansion and contraction, radially and longitudinally, of said walls; means connecting said inner wall to said balance; and further means for connecting said outer wall to an object exposed to aerodynamic forces.

4. In a balance unit, the combination comprising: a balance; a heat shield surrounding a major portion of said balance to substantially isolate it from adjacent heat sources, said heat shield comprising an inner shell having an open end adapted to encompass said balance; means for connecting said inner shell to said balance, said inner shell having a substantially closed second end, an outer shell having an open end and surrounding said inner shell in spaced relation thereto with said open ends in adjacency, said outer shell having a substantially closed second end, means to complete the closure of said second ends, yieldable sealing means extending across the juncture between said open ends to complete an evacuatable chamber between said shells, aerodynamic force transmitting means extending between said inner and outer shells; and means for connecting said outer shell to an object exposed to aerodynamic forces.

5. A balance unit as set forth in claim 4 wherein the aerodynamic force transmitting means enables relative temperature expansion and contraction, radially and longitudinally, of said shells.

6. A balance unit as set forth in claim 4 wherein the open ends of said shells are fixed against relative longitudinal movement and the closed ends of said shells are free of relative longitudinal movement to obviate stress and strain resulting from differential expansion and contraction.

7. In a balance unit, the combination comprising: a balance; a first tubular container closed at one end and having its other end open to receive said balance, a neck extending axially from its closed end, said neck containing a circumferential bearing surface, the other end of said container having radially extending ears; means to connect said first container to said balance; an outer tubular container closed at one end, and surrounding said first container, said outer container having an axial passage in its closed end positioned to movably receive said bearing surface of said neck; said outer container having notches in its other end to receive said ears; means cooperating with said outer container to clamp said ears in said notches; an expansion seal to seal the space between said neck and said axial opening in said outer container; an expansion seal to seal the space between said ears and said outer container; said first and outer containers forming a closed chamber therebetween; said closed chamber being evacuated; and, said first container being constructed of material whose properties provide a large temperature gradient to passage of heat through said first contained.

8. In a heat shield for a balance, the combination comprising: a first container having one end open for receiving said balance; a second container having one end open, said second container surrounding said first container with the open end of one adjacent the open end of said other container; one of said containers having ears on its surface adjacent its open end, said ears projecting toward said other container; the open end of said other container containing notches in its surface to receive said ears; means carried by one of said containers to clamp said ears in said notches of said other container; means to seal the space between said open ends of said containers to form a closed chamber between said containers; and means to provide for evacuation of said closed chamber.

9. A heat shield for a force balance comprising: an inner shell having an open end and adapted to encompass a force balance; means for connecting said shell to said force balance; said shell having a substantially closed second end; an outer shell having an open end and surrounding said inner shell in spaced relation thereto with said open ends in adjacency, and having a substantially closed second end; means to complete the closure of said second ends; yieldable sealing means extending across the juncture between said open ends to complete an evacuatable chamber between said shells; aerodynamic force transmitting means extending between said inner and outer shells; and means for securing to said outer shell an object which is to be exposed to aerodynamic forces.

10. A heat shield as claimed in claim 9 in which the aerodynamic force transmitting means enables relative temperature expansion and contraction, radially and longitudinally, of said shells.

11. A heat shield as claimed in claim 9 in which the open ends of said shells are fixed against relative longitudinal movement and the closed ends of said shells are free for relative longitudinal movement to obviate stress and strain resulting from differential expansion and contraction.

References Cited by the Examiner
UNITED STATES PATENTS

| 2,674,887 | 4/1954 | Worden | 73—382 |
| 2,885,890 | 5/1959 | Liccini et al. | 73—147 |
| 3,052,125 | 9/1962 | Damrel | 73—382 |

RICHARD C. QUEISSER, *Primary Examiner.*